BRUNNER & UEBERROTH.
Grain Winnower.
No. 106,994. Patented Sept 6, 1870.
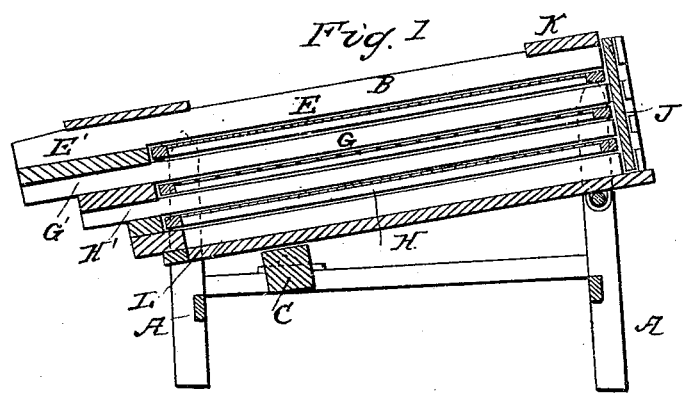
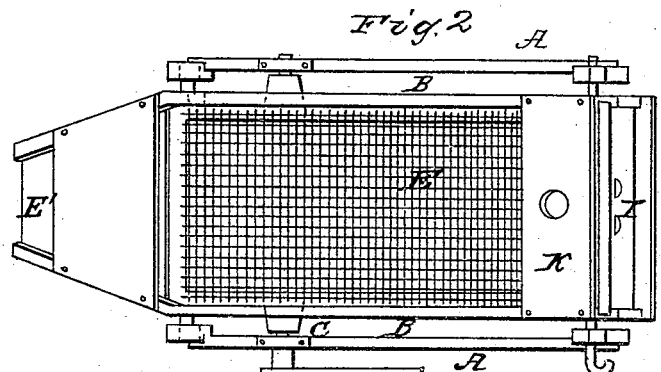
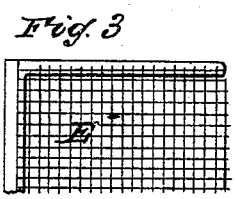

United States Patent Office.

JOHN D. BRUNNER AND EDWIN R. J. UEBERROTH, OF DOYLESTOWN, PENNSYLVANIA.

Letters Patent No. 106,994, dated Sepetmber 6, 1870; antedated August 26, 1870.

IMPROVEMENT IN GRAIN-SEPARATORS.

The Schedule referred to in these Letters Patent and making part of the same.

*To all whom it may concern:*

Be it known that we, JOHN D. BRUNNER and EDWIN J. R. UEBERROTH, of Doylestown, in the county of Bucks and in the State of Pennsylvania, have invented certain new and useful Improvements in Grain-Separators; and do hereby declare that the following is a full, clear, and exact description thereof, reference being had to the accompanying drawing and to the letters of reference marked thereon making a part of this specification.

The nature of our invention consists in the construction and arrangement of a grain-separator, and in the manner of operating the same.

In order to enable others skilled in the art to which our invention appertains to make and use the same, we will now proceed to describe its construction and operation, referring to the annexed drawing, in which—

Figure 1 is a longitudinal vertical section; and

Figure 2, a plan view of our separator;

Figures 3, 4, and 5, show portions of the screens in the separator.

A represents a frame of suitable dimensions, containing an inclined box, B.

This box is hinged or pivoted at or near its rear end in the frame A, and is inclined downward and forward, its front end resting upon a square shaft, C, the journals of which have their bearings in the frame A, and is turned by a crank, D.

In the sides of the box B are longitudinal grooves, a suitable distance apart, in which are inserted the screens E, G, and H.

The top screen, E, is of interlaced wire, forming tolerably large meshes; the second or middle screen, G, is of metal, perforated with a series of elongated slots, and the third or bottom screen, H, is of the same make as the top screen, except that the meshes are smaller.

Near the front end, in the bottom of the box B, is an opening, I, so that all the grain which has passed through all the screens will fall down through the same.

The front end of the box is provided with a series of spouts, E', G', and H', one for each screen, and each of said spouts extending beyond the spout immediately below, and thus each quality of grain can be readily separated.

The box with its screens is shaken by turning the square shaft C, which gives the box an up-and-down and shaking motion.

At the rear end of the box is a sliding door or board, J, and on the top of the box near the rear end is another board, K, with an aperture through which the grain is fed to the machine.

We do not claim, separately, the several devices herein shown, nor any general combination of the same.

What we do claim, and desire to secure by Letters Patent, is—

In the grain-separator herein described, the improved arrangement of parts, consisting of the hinged box B, with its graduating screens E G H, spouts E' G' H', opening I, sliding door J, and board K, and the square operating shaft C, when said parts are constructed and arranged as herein shown and described.

In testimony that we claim the foregoing, we have hereunto set our hands this 8th day of February, 1870.

JOHN D. BRUNNER.
E. R. J. UEBERROTH.

Witnesses:
ARTHUR N. MARR,
C. L. EVER.